Figures 1, 2:
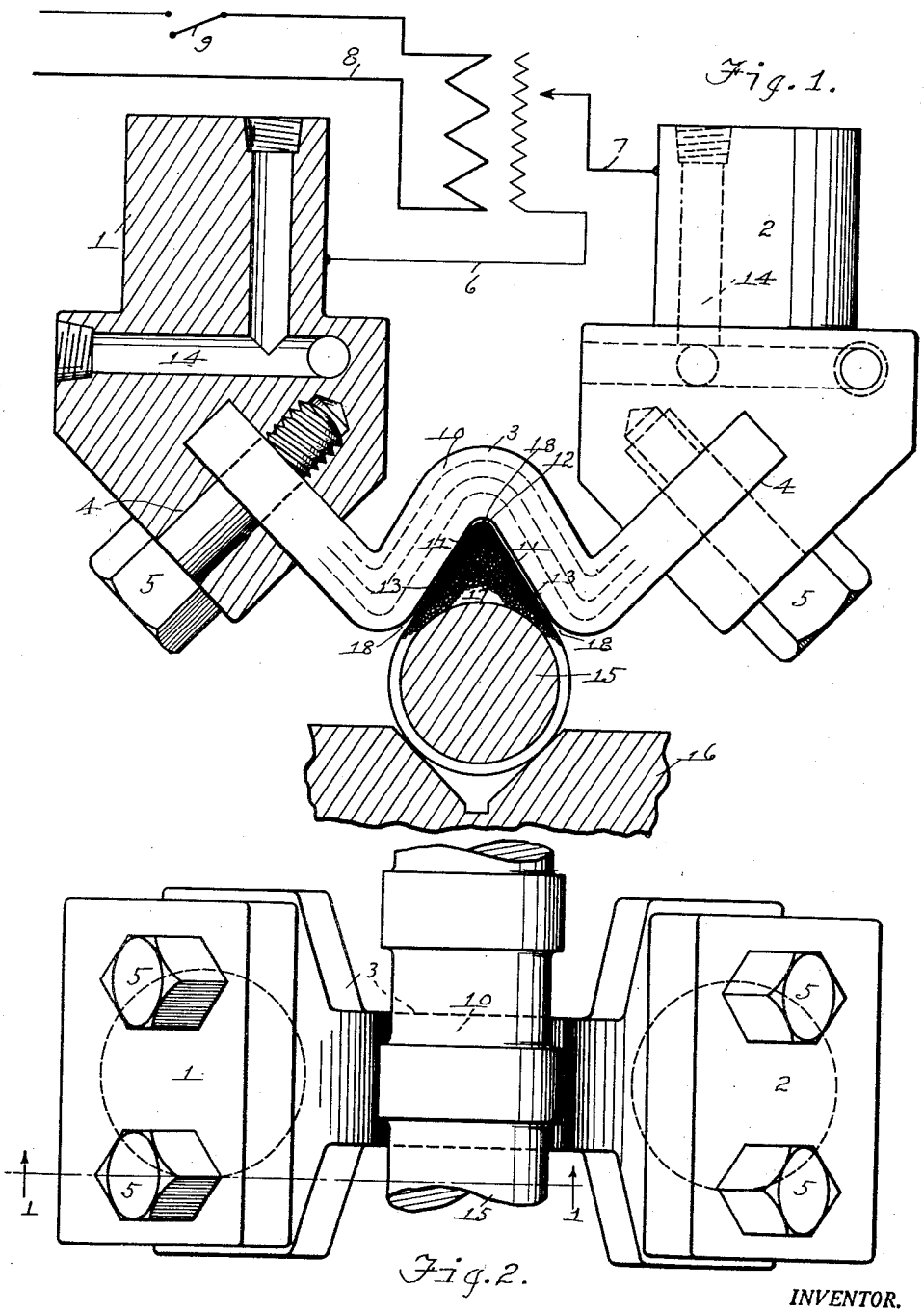

Jan. 9, 1940.　　　　　C. W. DAKE　　　　　2,186,626
APPARATUS FOR HARDENING FERROUS BODIES AND THE LIKE
Original Filed Jan. 6, 1937

Witness:
John S. Braddock

INVENTOR.
Charles W. Dake
BY
Rice and Rice
ATTORNEYS.

Patented Jan. 9, 1940

2,186,626

UNITED STATES PATENT OFFICE 2,186,626

APPARATUS FOR HARDENING FERROUS BODIES AND THE LIKE

Charles W. Dake, Grand Haven, Mich., assignor to Campbell, Wyant and Cannon Foundry Company, Norton Township, Mich., a corporation of Michigan Original application January 6, 1937, Serial No. 119,357. Divided and this application April 11, 1938, Serial No. 201,226

1 Claim. (Cl. 219—11)

The present invention relates to means or apparatus for carrying out my method of hardening ferrous bodies; and its object is to provide an improved apparatus whereby such bodies, as the cams on a shaft, may be readily, quickly and economically heated in the hardening process, especially in areas which must sustain greater wear and without involving other portions of said bodies; so that, in this particular use for example, the cam portions may be heated in hardening them to resist wear while the body of the shaft will remain unheated and unhardened and thus easily machined and resistive to breaking stresses to which it is subjected in use.

My means or apparatus for carrying out said method consists of an electric resistance unit shaped in conformity with the cam's camming surfaces and in electrically insulated relation therewith but in close proximity thereto, and means for flowing a current of electricity, preferably a high frequency alternating current, in said unit.

The above object and any other and more specific objects hereinafter appearing are attained by, and the invention finds preferable embodiment in, the illustrative apparatus particularly described in the body of this specification and illustrated by the accompanying drawing, in which:

Figure 1 is an elevational end view of means or apparatus for carrying out my hardening method, certain parts thereof and the body of a cam shaft being sectioned vertically on line 1—1 of Figure 2; and Figure 2 is a bottom plan view of the same.

The apparatus as thus illustrated includes a pair of spaced electric conductor members 1, 2, preferably of copper, electrically connected at their lower ends by the heating member 3, preferably of high heat-resisting steel, whose ends are seated in slots 4 in the lower ends of the members 1, 2 and tightly held therein by threaded bolts 5. The upper ends of members 1, 2 are electrically connected, and as shown are preferably connected for transmission of an alternating high frequency current by the indicated transformer having the secondary or induced current wires 6, 7 connected to members 1, 2 respectively, and the primary current wire 8 with a circuit opening, and closing-switch 9 and a suitable generator or source of electric energy.

The members 1, 2 have cross sectional areas great enough to provide a high degree of electric transmission therethrough, but the member 3, or its middle portion 10, has a cross sectional area restricted to provide resistance to the flow of current sufficient to heat said member (or its said portion 10) to a high degree. This member or its said portion is so shaped that its angularly disposed lower surfaces 11, 11 extend parallelly with, and in spaced close proximity to, the cam's high point 12 and its other wear surfaces 13 on the opposite sides of said point, in order that the current passing through the electric resistance member 3 will heat the same and by radiation from its surfaces 11, 11 will heat the cam's camming surfaces. The members 1, 2 desirably have passages 14 for a cooling fluid.

The illustrated apparatus is operated to carry out my process in the following manner. The cam shaft 15 is placed on a suitable support 16 below the member 3, with the cam 17 positioned between said member's surfaces 11, 11 and slightly spaced at 18 therefrom. This space 18, shown somewhat exaggerated for the sake of clearness in Figure 1, serves to electrically insulate the shaft and its cam from the member 3. The primary circuit 8 being closed, induces a current in the secondary circuit which current heats the member 3 and by radiation therefrom quickly heats the cam's said camming surfaces to a considerable depth, and the high frequency alternating current flowing in the member 3 generates eddy currents within the cam and assists in the rapid heating thereof.

While a high frequency alternating electric current is thus preferable, a direct electric current for heating member 3 may be used with good results.

The thus heated and changed portion of the cam (somewhat exaggerated for the sake of clearness) is shown in black at the cam's camming surfaces and progressively less black inwardly therefrom, and as extending to its greatest depth at the cam's high point but decreasing in depth progressively from said point. This result is due to the fact that the surfaces 11, 11 of member 3 converging toward the cam's high point heat the cam at and adjacent said point to a great depth and to a high degree; but said surfaces 11, 11, diverging from the high point to a constantly increasing distance apart, heat the cam's surfaces 13, 13 to a comparatively less depth and lower degree progressively toward the body of the shaft.

The said result is also due to the fact that the medial portion of the conductor member 3 adjacent the high point of the cam, having less cross-sectional area than its end portions, is heated by the current to a higher degree than said end portions.

The cam's camming surfaces are thus heated and hardened in areas and to depths where such hardening is most necessary to withstand the wear and stress of use, and are heated and hardened in areas and to less depths where wear-withstanding quality is less necessary, while the body of the shaft remains practically unheated and therefore not deformed, and unhardened and therefore easily machined and able to sustain torsional and other stress.

When the cam with the molding sand adhering thereto is inserted into the apparatus, the sand acts as an electric insulator; and a film of oxidation may be formed by the heat on said member's surfaces 11, 11 thus insulating the cam therefrom.

Cast iron of commerce has a carbon content sufficient to harden the cam by my process, and in any case a sufficient amount of carbon may be incorporated in the ferrous material for hardening the same for the intended use. The desired degree of heating of the cams may be attained by varying the amperage or quantity of the electric current or by varying the space between the cam and the member 3 of the apparatus.

The member 3 is heated sufficiently (i. e. to about 2000 degrees Fahr.) to heat the cams above their lower critical point (i. e. 1300 degrees Fahr. in iron or 1450 degrees Fahr. in steel). This heating of the cams may be accomplished in about five to ten seconds. The work, removed from the apparatus is cooled by exposure to atmosphere, or more rapidly by means of a spray of cool water to complete the hardening process.

The frequency change of the alternating current referred to should exceed five hundred reversals of direction of flow per second of time; and a unidirectional pulsating electric current may be employed in place of an alternating current.

This application for said means or apparatus for carrying out my method is divisional from my pending application, Serial Number 119,257, filed January 6, 1937, claiming said method.

The invention being intended to be pointed out in the claim, is not to be limited to or by details of construction of the particular embodiment thereof illustrated by the drawing or hereinbefore described.

I claim:

An apparatus for hardening the camming surfaces of a shaft's carbon-containing metal cams which have a medial high point and diverging sides extending therefrom toward the shaft, said apparatus including a continuous electric resistance conductor of comparatively less cross-sectional area at its medial portion and comparatively greater cross-sectional area at its ends, and having a lateral cavity in its medial portion with side walls extending divergingly from the bottom of the cavity, said cavity conforming with the shape of the cam and being adapted to receive the cam with its high point adjacent said bottom and its said sides parallelly adjacent said side walls, means for flowing an electrical current through the conductor lengthwise thereof to heat its medial portion to a relatively high degree adjacent the bottom of the cavity and to relatively lower degrees adjacent the cavity's side walls progressively toward the ends of the conductor for radiantly heating and hardening the camming surface of the cam in the cavity to degrees progressively increasing toward its high point and progressively decreasing toward the shaft, and water-cooled terminals with which the enlarged end portions of the conductor are in connection for further tempering the heat of the said end portions of the conductor.

CHARLES W. DAKE.